United States Patent Office 3,702,345
Patented Nov. 7, 1972

---

3,702,345
PROCESS FOR CONVERTING ETHYLENE TO NORMAL ALPHA OLEFINS
Herbert B. Fernald and William Gall, Glenshaw, Russell G. Hay, Gibsonia, and Alfred N. Kresge, Verona, Pa., assignors to Gulf Research & Development Company, Pittsburgh, Pa.
No Drawing. Filed Oct. 6, 1970, Ser. No. 78,557
Int. Cl. C07c 3/10
U.S. Cl. 260—683.15 D        9 Claims

ABSTRACT OF THE DISCLOSURE

In a process wherein ethylene is treated with an aluminum hydrocarbon to obtain a product predominating in normal alpha olefins, the improvement which involves heating said product at an increased temperature level for a short period of time prior to recovery of the normal alpha olefins.

---

This invention relates to a process for polymerizing ethylene in the presence of a small amount of trialkyl aluminum to obtain an alpha olefin product containing reduced amounts of saturates.

The stepwise conversion of gaseous ethylene to higher straight chain, normally liquid olefins having the double bond in the terminal or alpha position can proceed as follows:

$$CH_2=CH_2+CH_2=CH_2 \rightarrow CH_3-CH_2-CH=CH_2$$

$$CH_3-CH_2-CH=CH_2+CH_2=CH_2 \rightarrow$$
$$CH_3-CH_2-CH_2-CH_2-CH=CH_2, \text{ etc.}$$

This polymerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process, defined and claimed herein, can be described in terms of three major reactions.

In the propagation (growth) reaction, the hydrocarbon group, for example, an alkyl group on an aluminum atom containing $n$ ethylene units, can add an ethylene molecule to become an alkyl group of $n+1$ ethylene units as follows:

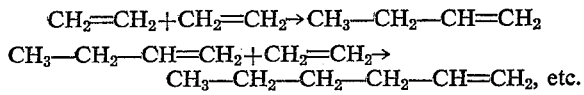

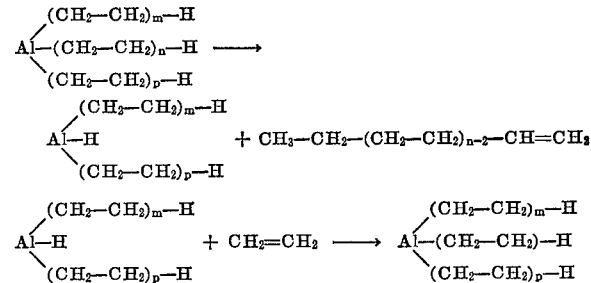

The growth and displacement reactions occur repeatedly as long as there is unreacted ethylene present. Therefore, the reaction is advantageously afforded a relatively long residence time. As long as there is free ethylene in the presence of catalyst in the reactor under reaction conditions, each mol of catalyst present will produce additional normal alpha olefin product. Therefore, a long residence time is conducive to a high alpha olefin yield per mol of catalyst, i.e., a relative high catalyst efficiency.

The third reaction is similar to the first, except that a product alpha olefin can add to the aluminum alkyl, rather than ethylene, to form a branched chain aluminum alkyl group. However, this structure is quite unstable and rapidly decomposes to form a hydride and an olefin having a vinylidene structure:

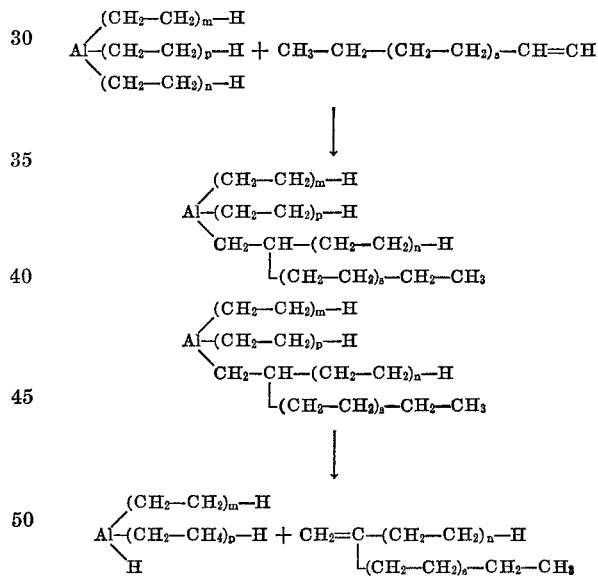

The subscript $s$ can be different from the subscript previously employed above. The decomposition is so rapid compared to the addition of another ethylene molecule to the branched alkyl that essentially all reactions of this type result in an olefin of vinylidene structure and regeneration of an aluminum ethyl alkyl group. As a result, there will be few, if any, alpha olefins with branching beyond the beta carbon.

In view of the fact that the production of normal alpha olefins is the object of the above reactions, ethylene is the sole olefin which can be employed in the charge. The normal alpha olefins produced will have from four to 40 even-numbered carbon atoms, primarily from four to 20 even-numbered carbon atoms, and will be substantially liquid with practically no solid polymer produced except

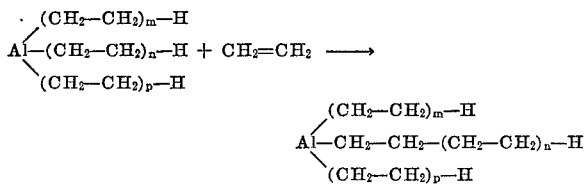

The different subscript used at each $C_2$ group indicates that a different stage of growth at each group is likely.

The transalkylation (displacement) reaction, which occurs concurrently with the growth reaction herein, consists of two steps. These are, first, thermal decomposition of an aluminum alkyl group to a hydride plus alpha olefin, followed by a rapid reaction of the hydride with ethylene to regenerate an ethyl group which can start another growth cycle. The thermal decomposition is much slower than reaction of ethylene with a hydride and, therefore, is the rate-determining step for the overall reaction:

as undesired product. The normal alpha olefins produced, particularly the $C_{12}$, $C_{14}$ and $C_{16}$ alpha olefins, have high utility for the production of detergents.

The catalyst employed herein can be defined by the following structural formula

wherein $R_1$, $R_2$ and $R_3$ can be any hydrocarbon substituent. However, since the hydrocarbon substituent is easily and quickly replaced with ethylene, or an alpha olefin produced herein, and the resultant aluminum trialkyl becomes the effective catalyst, it is apparent that the catalyst herein is an aluminum trialkyl wherein the alkyl portions thereof have from two to 40 carbon atoms, preferably from two to 30 carbon atoms. Examples of such catalysts which can be employed are $Al(CH_3)_3$, $Al(C_2H_5)_3$, $Al(C_3H_7)_3$, $Al(C_4H_9)_3$, $Al(C_5H_{11})_3$ $Al(C_9H_{19})_3$, $Al(C_{12}H_{25})_3$, $Al(C_{16}H_{33})_3$, etc. The catalyst can be used as such, but preferably is dispersed in an inert hydrocarbon solvent. Since it is desired to produce a liquid alpha olefin product, rather than a relatively high molecular weight solid polymer, the catalyst defined above should be substantially free of catalyst components, such as, for example, $TiCl_4$, which will tend to cause production of relatively high molecular weight solid polymers. The amount of catalyst required herein is not critical and can be present in an amount from about $1 \times 10^{-4}$ to about $1 \times 10^{-2}$ mols, preferably from about $1.5 \times 10^{-4}$ to about $5.0 \times 10^{-3}$ moles, per mol of ethylene.

The reaction is performed in the presence of an inert, unreactive hydrocarbon solvent, such as paraffins, high molecular weight olefinic materials, naphthenes or alkyl aromatics having 18, 20 or more carbon atoms, or a recycle stream comprising the $C_{18}$ or $C_{20}$ or even higher alpha olefin product of the process. As noted, the components in the alpha olefin product can have as many as about 40 carbon atoms, but more generally contains a small proportion of components above about 28 or 30 carbon atoms. An advantageous solvent that can be employed herein, therefore, can comprise a $C_{18}$ or $C_{20}$ or higher alpha olefin recycle stream, or can be composed, for example, solely of $C_{22}$ to $C_{28}$ recycle alpha olefins. A solvent stream comprising other saturated or unsaturated, branched or unbranched hydrocarbons can also be used.

The solvent exerts its beneficial effect upon the process in the initial stages of the reaction, i.e., near the zone of the reactor tube whereat ethylene and catalyst are first contacted with each other, and after the reaction proceeds to a significant extent the product itself assumes the solvent function and eventually far exceeds in quantity the initially-added solvent. Catalyst which is continuously added to the reactor is advantageously dissolved in the solvent in any suitable concentration range, such as between about 0.5 to about 50 percent by weight, preferably between about two and about 15 percent by weight. The concentration of catalyst in the solvent will depend upon both the quantity of solvent desired in the system and upon the desired ratio of catalyst to ethylene charge.

Upon addition of catalyst and solvent to the ethylene charge in the reactor, substantially all the catalyst remains dissolved in the solvent. In order to encourage the production of normal alpha olefins in the reactor, it is important that as much as possible of the gaseous ethylene reactant be rapidly dissolved in the phase containing the catalyst, i.e., the liquid solvent phase. Under the temperature and pressure conditions of the reactor a substantial quantity of ethylene is almost immediately dissolved in the liquid solvent phase, enabling the reaction to proceed rapidly. As normal alpha olefin product is produced, this product, in turn, is available as a solvent, and as the reaction proceeds the product produced in the reactor becomes dominant in quantity.

The temperature of the reaction can range from about 285° to about 615° F., generally from about 350° to about 430° F., preferably from about 380° to about 400° F. Low temperatures favor the growth reaction and will result in a higher average molecular weight product. At high temperatures, the average molecular weight will be lower because the transalkylation reaction predominates. The proportion of $C_{12}$ alpha olefin in the product tends to remain relatively constant with temperature changes within the most preferred range of this invention, however, with lower temperatures favoring a relatively higher proportion of product above $C_{12}$ and higher temperatures favoring a relatively higher proportion of product below $C_{12}$. The upper pressure range is not critical and can be as high as about 1000 atmospheres, or even higher, but the lower pressure range is critical and should be sufficiently high so that most of the alpha olefin product is a liquid under reaction conditions and so that most of the catalyst and most of the ethylene are dissolved or dispersed in the liquid. It is important to have as high as possible a concentration of ethylene in the phase containing the catalyst, otherwise olefin product rather than ethylene will tend to react with the catalyst to produce vinylidenes. Therefore, the pressure should be sufficiently high to force as much ethylene as possible into the liquid phase together with the catalyst. After there has been a conversion of about 30 to about 90 mol percent, preferably about 50 to about 75 mol percent, of ethylene, which will involve a residence time of at least about five minutes, preferably about 20 to about 120 minutes, there is sufficient liquid product to dissolve substantially all the ethylene and product a single homogeneous phase in the reactor. Thus, the pressure in the reactor must at all times be at least about 1000, and preferably at least about 2000 pounds per square inch gauge.

It is important to maintain conversion levels of ethylene below the levels defined hereinabove, because at higher conversion levels the production of branched olefins (vinylidenes) increases sharply. The reason is that at high conversion levels the proportion of product olefin to ethylene in the reactor becomes sufficiently high for the product olefin to compete significantly with the ethylene in the growth reaction. The participitation of any olefin higher than ethylene in the growth reaction results in a vinylidene product, and only by permitting ethylene exclusively to participate in the growth reaction is the product the desired normal alpha olefin.

The reactor is desirably an elongated reactor, for example, wherein the ratio of length to internal width is from about 200:1 to about 100,000:1, but preferably within a range of about 2000:1 to about 50,000:1. In order to achieve the highest conversion of ethylene to normal alpha olefin per mol of catalyst used, the length of the reactor is made as long as possible and is only limited by practical and economic size restrictions and by pressure drop. There are a number of reasons for utilizing a very long tubular reactor. First, a very long tubular reactor permits excellent heat transfer for removal of heat of reaction. Second, it advantageously reduces backmixing, and with proper flow of materials therein backmixing can be practically eliminated. Third, a long reactor length is conducive to long residence time, which permits achievement of a high catalyst efficiency because of additional conversion per mol of catalyst. Finally, a long reactor length tends to minimize the percentage of paraffin in the alpha olefin product. The final reason is based upon the fact that upon separation of the aluminum alkyl catalysts by treatment with caustic, the alkyl components of the catalyst are converted to paraffins which have boiling points close to those of the most desired alpha olefin components of the product and are therefore difficult to remove from the desired normal alpha olefins. Since the absolute amount of paraffins produced is fixed by the quantity of catalyst used, the greater the quantity of alpha olefins produced with said catalyst the smaller will be the percentages of paraffins in the product.

When it is desired to terminate the reaction, the product is withdrawn from the tubular reactor and is reduced in temperature and pressure, whereupon most of the gaseous olefins are flashed off. The liquid product is then treated with aqueous sodium hydroxide to deactivate the catalyst in accordance with the following equation:

$$2H_2O + 2NaOH + 2AlR_3 \rightarrow Na_2OAl_2O_3 + 6 \text{ Paraffin}$$

The resulting product is then subjected to conventional recovery procedures, for example, distillation to recover individual normal alpha olefins and/or normal alpha olefin fractions. Unfortunately, in the recovery of the normal alpha olefins the same are contaminated with the paraffins or saturates, since the individual normal alpha olefins and paraffins can posses overlapping distillation levels.

We have found that the paraffin content of the normal alpha olefin product can be substantially reduced by heating the alpha olefin product at an increased temperature level for a short period of time after the product is removed from the reaction zone but prior to deactivation of catalyst with sodium hydroxide. More specifically, the reaction product from the tubular reactor is depressured from reaction pressure to a pressure of about 50 to about 1000 pounds per square inch gauge, preferably to about 200 to about 700 pounds per square inch gauge. At this pressure the total reaction product is then subjected to a temperature of about 500° to about 650° F., preferably about 550° to about 600° F., over a period of about 0.5 to about 2.0 seconds, preferably about 1.0 to about 1.5 seconds. The product is then quickly cooled to a temperature below about 425° F., for example, about 150° to about 410° F., to inhibit further polymerization. Such cooling is preferably carried out in two stages, for example, in less than about one second, preferably within about 0.5 to about 0.75 second, to a temperature below about 425° F., and then over a period of about one to about 10 seconds, preferably about 1.5 to about five seconds, to a temperature below about 200° F.

The resulting product is then treated with aqueous sodium hydroxide in conventional manner to deactivate aluminum trialkyl catalyst as described above. For example, such treatment can involve the use of aqueous sodium hydroxide having a concentration of about one to about 50 percent by weight, preferably about five to about 30 percent by weight at a temperature of about 125° to about 250° F. and a pressure of about 0 to about 1000 pounds per square inch gauge, preferably about 10 to about 600 pounds per square inch gauge. The amount of sodium hydroxide needed is that amount stoichiometrically required to react with aluminum trialkyl, although from about two to about 10 times the stoichiometric amount can be used. Separation of alpha olefins from the treated prroduct can be effected in any conventional manner, for example, by distillation.

The process can further be illustrated by the following. Several runs were made using a tubular reactor, 111 feet long and having an inside diameter of 0.302 inch, submerged in a pressurized boiling water bath, wherein the bath temperature was maintained at 384° F. and the pressure 3400 pounds per square inch gauge during the reaction period. A feed consisting of 94.21 percent by weight of ethylene 0.35 weight percent of triethyl aluminum and 5.44 percent by weight of a solvent composed of $C_{22}$ to $C_{28}$ normal alpha olefins from a prior polymerization of ethylene with triethyl aluminum was continuously passed through the tubular reactor at a feed to volume ratio of 44 pounds per hour per cubic feet of reaction volume. The residence time in each run was approximately one hour and the ethylene conversion 55 percent by weight. In the base run the reaction product was treated with caustic without prior treatment, while in the remaining runs the product was immediately heated at a higher temperature and a pressure of 600 pounds per square inch gauge for a selected period of time, the product was then quickly cooled over a period of less than about one second to a temperature of 410° F. or lower and subsequently treated with caustic to deactivate the catalyst. The results obtained are tabulated below in Table I.

TABLE I

| Run No. | Temperature at which reaction product is heated, °F. | Residence time, sec. | Product analysis, weight percent | | | | $C_{12}$ normal alpha olefins, wieght percent [1] |
|---|---|---|---|---|---|---|---|
| | | | Saturates | | | Normal alpha olefins $C_{12}$ | |
| | | | $C_6$ | $C_2$ | $C_8$ | | |
| 1 | Base run | | | 1.81 | | 92.61 | 94.3 |
| 2 | 600 | 1.17 | | 0.51 | | 94.15 | 94.7 |
| 3 | 600 | 1.17 | | 0.55 | | 94.28 | 94.8 |
| 4 | 600 | 1.17 | | 0.29 | | 94.25 | 94.5 |
| 5 | 600 | 1.98 | | 0.18 | | 93.41 | 93.6 |
| 6 | 600 | 4.00 | | 0.30 | | 87.65 | 87.9 |
| 7 | 450 | 1.17 | 1.09 | 1.43 | 1.81 | 93.73 | 95.1 |
| 8 | 500 | 1.17 | 0.64 | 0.75 | 1.18 | 93.55 | 94.3 |
| 9 | 525 | 1.17 | 0.82 | 0.72 | 1.02 | 93.92 | 94.6 |
| 10 | 550 | 1.17 | 0.69 | 0.40 | 0.64 | 94.39 | 94.8 |
| 11 | 575 | 1.17 | 0.71 | 0.37 | 0.48 | 94.29 | 94.6 |
| 12 | 600 | 1.17 | 0.69 | 0.36 | 0.54 | 93.79 | 94.1 |

[1] Saturate-free basis.

The data in the above table clearly illustrates the advantages obtained herein and the critical nature of temperature and residence time. Analysis of $C_{12}$ product, and of $C_6$ and $C_{18}$ product where taken, is considered representative of product of different carbon number produced herein. Note in each run wherein the alpha olefin reaction product was maintained at a temperature at or above 500° F. and the residence time was below about two seconds, there was a substantial reduction in saturates content over the base run wherein no such heating was carried out and surprisingly no product degradation. In Run No. 6 wherein the residence time was four seconds, although a substantial reduction in saturates was obtained, severe product degradation occurred. In Run No. 7 wherein a temperature below 500° F. was used no significant improvement in saturates reduction took place.

Obviously, many modifications and variations of the invention, as hereinabove set forth, can be made without departing from the spirit and scope thereof, and therefore only such limitations should be imposed as are indicated in the appended claims.

We claim:

1. In a process wherein ethylene is treated with an aluminum trialkyl at an initial temperature of about 285° to about 615° F. and an initial pressure of about 1000 pounds per square inch gauge to about 1000 atmospheres sufficient to obtain a product predominating in normal alpha olefins and said product is treated with sodium hydroxide to deactivate said aluminum trialkyl, the improvement which comprises heating all of said product at a further elevated temperature of about 500° to about 650° F. and a reduced pressure of about 50 to about 1000 pounds per square inch gauge for a residence time of about 0.5 to about 2.0 seconds in a separate step prior to said deactivation to reduce the saturate content of the final normal alpha olefin product.

2. The process of claim 1 wherein said further elevated temperature is about 550° to about 600° F. and said residence time is about 1.0 to about 1.5 seconds.

3. The process of claim 1 wherein said initial temperature is below said latter elevated temperature and within the range of about 350° to about 430° F. and said initial pressure is at least about 2000 pounds per square inch gauge.

4. The process of claim 1 wherein said aluminum trialkyl is triethyl aluminum.

5. The process of claim 1 wherein said reaction is carried out in an elongated coil.

6. The process of claim 1 wherein said aluminum trialkyl is present in an amount from about $1 \times 10^{-4}$ to about $1 \times 10^{-2}$ mols per mol of ethylene.

7. The process of claim 1 wherein said aluminum trialkyl is present in an amount from about $1.5 \times 10^{-4}$ to about $5.0 \times 10^{-3}$ mols per mol of ethylene.

8. The process of claim 1 wherein from about 30 to about 90 mol percent of the ethylene charge is converted during reaction.

9. The process of claim 1 wherein from about 50 to about 75 mol percent of the ethylene charge is converted during reaction.

References Cited

UNITED STATES PATENTS

| | | | |
|---|---|---|---|
| 3,531,253 | 9/1970 | Fernald et al. | 260—683.15 X |
| 3,457,322 | 7/1969 | Wentz | 260—683.15 |
| 3,310,600 | 3/1967 | Ziegler et al. | 260—683.15 |
| 3,482,000 | 12/1969 | Fernald et al. | 260—683.15 |

PAUL M. COUGHLAN, JR., Primary Examiner

UNITED STATES PATENT OFFICE

CERTIFICATE OF CORRECTION

Patent No. 3,702,345   Dated November 7, 1972

Inventor(s) Herbert B. Fernald, William Gall, Russell G. Hay and Alfred N. Kresge It is certified that error appears in the above-identified patent and that said Letters Patent are hereby corrected as shown below:

Column 6, Table I, Subheadings "$C_2$" and "$C_8$" under "Saturates", should read "$C_{12}$" and "$C_{18}$", respectively.

Signed and sealed this 8th day of May 1973.

(SEAL)
Attest:

EDWARD M. FLETCHER, JR.
Attesting Officer

ROBERT GOTTSCHALK
Commissioner of Patents